Figure 1:
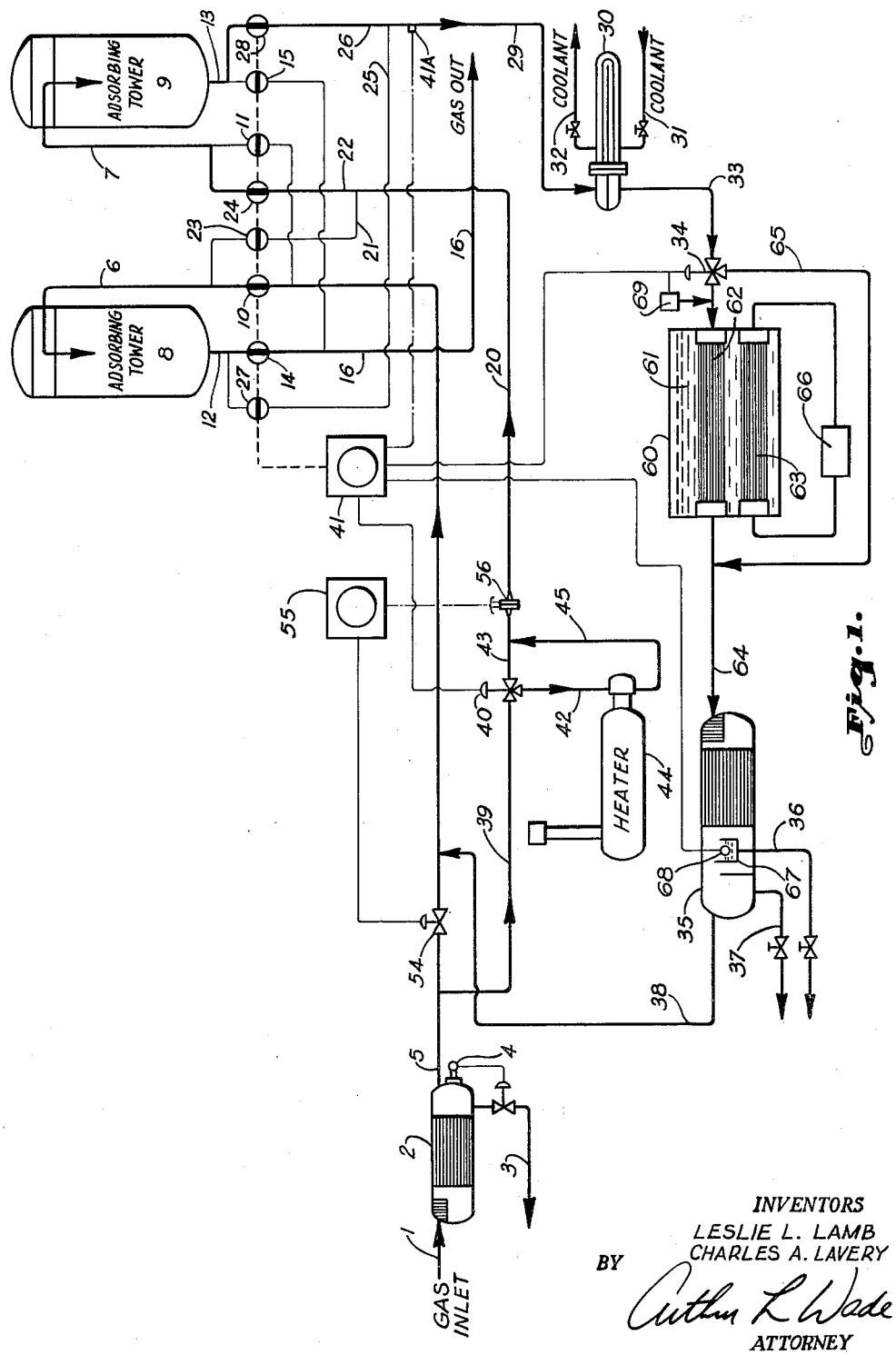

Dec. 12, 1961

L. L. LAMB ET AL 3,012,630

PROCESS AND APPARATUS FOR RECOVERING
HYDROCARBONS FROM GAS STREAMS

Filed Oct. 5, 1959

2 Sheets-Sheet 1

INVENTORS
LESLIE L. LAMB
CHARLES A. LAVERY
BY
*Arthur L Wade*
ATTORNEY

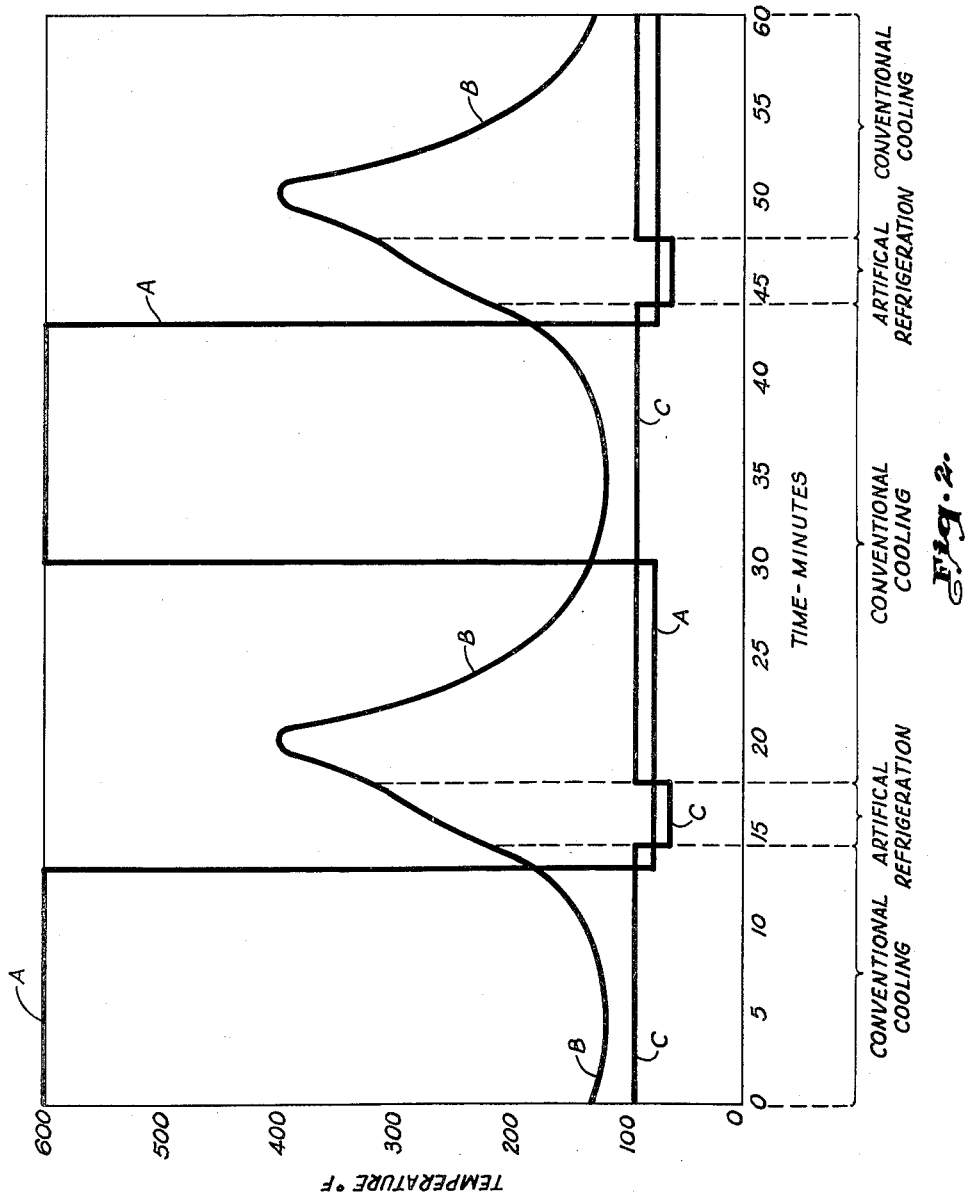

United States Patent Office 3,012,630
Patented Dec. 12, 1961

3,012,630
PROCESS AND APPARATUS FOR RECOVERING HYDROCARBONS FROM GAS STREAMS
Leslie L. Lamb and Charles A. Lavery, Tulsa, Okla., assignors to National Tank Company, Tulsa, Okla., a corporation of Nevada
Filed Oct. 5, 1959, Ser. No. 844,535
12 Claims. (Cl. 183—4.7)

This invention relates to the dehydration of gas and the recovery of condensable hydrocarbons therefrom. More specifically, the invention relates to processing natural gas, at its source, prior to transmission thereof through pipelines, in order to remove moisture and condensable hydrocarbons.

For the purposes of this invention the flow of gas to be processed will be known as the flow, or the main, stream. The flow, or main, stream of natural gas from a wellhead is always saturated, or partially saturated, with moisture in accordance with its origin, its pressure and temperature. If the gas is transmitted with this moisture in it, resulting condensation may lead to severe corrosion of the metal pipeline through which it is transmitted. Further, this moisture at lowered temperatures may form hydrates which clog the pipelines and valves. One common practice involves conducting the wet gas through large cylinders filled with adsorbent material. Using at least two cylinders, it is possible to have a continuous gaseous transmission through adsorbent by alternating between the plurality of towers. The towers with adsorbent material saturated with moisture are reactivated with a heated gas of some type, possibly air itself.

Additionally, it is recognized that such streams are saturated, or partially saturated, with valuable condensable hydrocarbons, such as gasoline, which can be removed from the gas stream by the adsorbent material. The removal of both the condensable hydrocarbons and water from natural gas, prior to or during transmission is possible in this manner, but the removal must be carried out efficiently and economically.

Many of the problems of water and hydrocarbon removal from natural gas by adsorbent material center about the handling of a reactivation fluid with which the adsorbed water and hydrocarbons are removed from the saturated desiccant material. It has been customary to split-off a portion of the main stream for this purpose. The split-off, reactivation, stream is passed through a heater to elevate its temperature enough so that when it is passed through the beds of saturated adsorption material it will vaporize and remove the water and hydrocarbons. Subsequently, the reactivation stream is cooled in a condenser. The condenser has employed combinations of air, water and gas in attempts to reduce the temperature of the reactivation stream so that when it is returned to the main stream its equilibrium conditions will approach those of the main stream. The reactivation stream output of the condenser is passed to a separator where the condensed water and hydrocarbons are removed as separated liquid phases. In this so-called "open cycle" type of regeneration circuit, the gaseous portion of the reactivation stream is usually returned to the main stream at a point where the main stream goes into the adsorption step. However, the reactivation stream can be returned to the main stream below the adsorbent beds.

Considering the various adsorption systems using dry desiccants, those using the open-cycle type of regeneration circuit are the least expensive, if the various systems are compared as exposing equal quantities of adsorbent to the main gas stream. Not only is this open-cycle system the least expensive, but it is also the simplest and involves a minimum of operating difficulties. Further, as long as the gas stream process is reasonably lean in recoverable hydrocarbons, i.e. in the order of 0.08 to 0.15 gallon per million feet of gas processed, it can usually be shown that the open-cycle system provides reasonably good recovery per unit of investment in terms of over-all net cash flow to the producer over the life of the investment.

Admittedly, if conventional means of cooling leave uncondensed recoverable hydrocarbons in the regeneration circuits of the open-cycle type, there is a problem when these hydrocarbons are returned to the main stream and lost downstream of the process or they constitute a cyclic dead-load which will shift between the adsorbent beds. This problem can be overcome by reducing the temperature of the regeneration stream as it comes from a bed being regenerated until the liquefiable hydrocarbon content of the regeneration stream is lowered, by condensation, to more closely approach the equilibrium conditions which exist in the main stream.

For all practical purposes, the equilibrium conditions of the two streams are equal if their temperatures are thus equalized. However, the cost of reducing the temperature of the regeneration stream over the complete cycle of operation is not economical. Mechanical refrigeration is expensive. This means of cooling the open-cycle will not keep the open-cycle system commercially competitive with the regeneration systems employing the principal of recycling the regeneration stream in a so-called "closed-cycle."

The present invention offers a basis on which the open-cycle system, with its simplicity and relative lower first cost, can meet its condensation problem with a coolant for the regeneration gas in addition to the conventional, or commonly available, coolant. The coolant contemplated is additive to the conventional usage of normal liquid or gas-to-gas cooling in these systems. Mechanical refrigeration, as a source of the contemplated additional coolant, becomes an economic possibility under the teachings of the present invention. The results that can be obtained by mechanical refrigeration are spectacular. Data presently available demonstrates that on flow streams of natural gas in the neighborhood of 80° F. to 90° F., an increase of condensation from the regeneration stream of some 30%, or more, for a 30° F. reduction in condensation temperature in the regeneration circuit is possible. It is this increase in potential recovery from the regeneration stream for any fixed amount of adsorption that is to be compared to the increased cost of the mechanical refrigeration.

The present invention demonstrates the discovery that the refrigeration effect need not be applied continuously to reach the economic success of the open-cycle. There is only a relatively small portion of each cycle of operation of the regeneration circuit when the advance of the mechanical refrigeration is needed to obtain the high recovery of a selected range of hydrocarbons. The concepts of the present invention take advantage of this fact, applying the relatively expensive mechanical refrigeration effect only when required to obtain the results desired.

A primary object of the present invention is to mechanically refrigerate a stream of gas which contains liquefiable hydrocarbons for only the limited period of time when the stream of gas contains a high concentration of a selected range of the liquefiable hydrocarbons.

Another object is to continuously develop a mechanical refrigeration effect within a storage capacity and apply the stored effect to cool the regeneration gas over a relatively short portion of the regeneration cycle of an adsorption process.

Another object is to continuously develop a mechanical refrigeration effect within a storage capacity and apply both the continuously developed effect and the stored effect to cool the regeneration gas of an adsorption process over a relatively short portion of the regeneration cycle.

Another object is to mechanically refrigerate the regeneration gas of an adsorption process over a relatively short portion of the regeneration cycle when the regeneration gas contains a high concentration of a selected range of liquefiable hydrocarbons to approach, or attain, equilibrium between the stream of gas to be processed and the refrigerated regeneration gas.

The present invention contemplates a process for removing liquefiable components from a stream of natural gas by the use of a dry desiccant. The natural gas stream containing the components to be removed is passed through the dry desiccant, the desiccant adsorbing the components. The desiccant is then regenerated with a side stream of the natural gas to be processed. The regeneration stream of gas is heated and passed through the desiccant to vaporize the liquefiable components adsorbed from the main stream of natural gas. The regeneration stream is then cooled to condense liquefiable components and so the stream can be used to reduce the temperature of the desiccant for further adsorption service. Normally available cooling mediums such as air, water, or the stream of natural gas at ambient conditions are first applied to the stream. Then a body of liquid, cooled by artificial refrigeration, is heat exchanged with the regeneration stream of gas only for the limited time the stream flows from the bed with a high concentration of vaporized liquefiable components of a selected range. The regeneration stream, and the liquids condensed by the heat exchanges, are then passed into a separator where the selected range of liquefiable hydrocarbons is recovered and from which the gaseous portion of the regeneration stream is returned to the main stream. The temperature of the regeneration stream is brought low enough to bring the regeneration and main streams into equilibrium and to increase the adsorptive capacity of the beds of desiccant contacted by the streams.

The present invention further contemplates a process and apparatus for cooling the body of liquid by a mechanical refrigeration unit which is continuously operated. The heat exchange between the cooled body of liquid and the regeneration stream is carried out only during the specific period in which there is a demand for condensing a selected range of liquefiable hydrocarbons from the regeneration stream while the mechanical unit continuously removes heat from the body of liquid over the complete cycle.

The invention further contemplates a system for sensing variables of the regeneration stream which indicates when the stream, as it flows out of the bed, is rich in the selected range of liquefiable hydrocarbons. The system responds to one, or all, of these variables to automatically heat exchange the continuously cooled body of liquids with the regeneration stream. The result is to condense enough hydrocarbons from the regeneration stream to make the regeneration and main streams equal in the selected range of hydrocarbons available per unit of gas and to increase the adsorptive capacity of the bed.

Other objects, advantages and features of this invention will become apparent to one skilled in the art upon consideration of the written specification, appended claims, and attached drawings wherein:

FIG. 1 is a diagrammatic representation of a complete hydrocarbon recovery system embodying the present invention; and FIG. 2 is a graph of temperature variations in the system of FIG. 1.

*Main stream conduit*

In FIG. 1, conduit 1 represents the means of bringing natural gas into the adsorption process controlled in accordance with the invention. The gas of conduit 1 is to be dried in the process and its condensable hydrocarbon content extracted and recovered. Conduit 1 specifically introduces the gas into separator 2.

Separator 2 may take any of several well-known forms, any well-known form of vessel in which liquid and gaseous phases separate will be satisfactory. The separation process carried on in separator 2 is a relatively crude function of removing free liquids which arrive in conduit 1 from the gas stream. The liquids may be both water and hydrocarbons and are removed through conduit 3, controlled by level controller 4. The gaseous phase passes from separator 2 by way of conduit 5.

Conduit 5 is a part of the first circuit of the process which handles the main, or flow, stream of natural gas from which condensable hydrocarbons and water are removed by adsorption. Conduit 5 is divided into branch conduit 6 and branch conduit 7 in order to conduct the main stream through adsorbent beds. These branch conduits specifically connect to adsorbing tower 8 and adsorbing tower 9 and are valved to alternately direct the gas of conduit 5 through beds of adsorbent material in these towers. As illustrated, the towers are, essentially, cylinders with their longitudinal axis extended vertically. The flows from conduits 6 and 7 are shown directed downwardly through these towers.

Valve 10 in branch conduit 6 and valve 11 in branch conduit 7 alternately open and close to direct the main stream of conduit 5 through the adsorbent beds. Branch conduit 6 is represented with a relatively heavy line of drawing on each side of its valve 10, to indicate that the main stream is illustrated as passing through valve 10 and into tower 8.

Conduit 12 removes gas from tower 8. Conduit 13 removes gas from tower 9. Valves 14 and 15 alternately direct the main, or flow, gas stream from the towers into conduit 16. Conduit 12, through valve 14, is represented by a heavy line in order to indicate that the flow stream is passing from tower 8 into outlet conduit 16. The main circuit is now more completely defined as conduit 5 passing through valve 10 and valve 14 to conduit 16, as shown in FIG. 1, or alternately through valve 11 and valve 15 to conduit 16. The two sets of valves are, basically, time-cycled between their two positions to alternately open and close in directing the main stream through the two adsorbent beds as each bed approaches saturation with water and condensable hydrocarbons.

*Adsorbent material*

Various types of adsorbent material may be employed in towers 8 and 9. Silica gel has been successfully used to recover a large percentage of the condensable hydrocarbons in main streams. The selection of the specific adsorption material, and the arrangement of flow within the towers, depends on specific design conditions which are not considered further here.

Once the adsorbent material has adsorbed the water and condensable hydrocarbons from the main stream, another stream of gas is required to remove these products from the bed. Specifically, a gas stream is passed through the bed, heated enough to vaporize the water and hydrocarbons. The adsorbent bed is thereby reactivated so it can again be used to remove another quantity of water and hydrocarbons from the main stream. The heated gas stream, with the vaporized water and hydrocarbons contained therein, is then cooled to condense the water and hydrocarbons.

*The regeneration circuit connection with towers 8 and 9*

The circuit for the reactivation stream of gas is referred to as the second circuit and is traced from conduit 20. Branch conduits 21 and 22 alternately pass the reactivation gas from conduit 20 through towers 8 and 9. Branch conduit 21 is connected to conduit 6 between valve 10 and tower 8. Branch conduit 22 is connected to conduit 7 between valve 11 and tower 9. Conduit 21 passes through valve 23 and conduit 22 passes through valve 24. Conduit 22 is repreesnted in heavy outline to indicate that the reactivation gas from conduit 20 is passing to tower 9 at the same time the main stream for conduit 5 is being passed to tower 8.

The reactivation gas passed through the towers is also removed through conduits 12 and 13. However, valves 14 and 15 are switched to prevent this reactivation gas from passing out of the system through conduit 16. Conduits 25 and 26 connect to conduits 12 and 13 between valve 14 and 15 and their respective towers. Valves 27 and 28 are included in conduits 25 and 26 in order to alternately pass the reactivation gas into conduit 29. Conduit 26 is represented in heavy line to show the circuit for the reactivation gas is completed through tower 9 from conduit 20 to conduit 29.

General function of the regeneration circuit

The vaporized hydrocarbon and water in the heated reactivation gas of conduit 29 is condensed therefrom in order to remove the water and recover the hydrocarbons. Several choices of cooling sources may be available for condensing these liquids from the reactivation gas in conduit 29. The one, or combination, of conventional sources selected is a matter of design, involving the characteristics of the particular main stream, the availability of relatively cool fluids, size of equipment, and etc.

In FIG. 1 the reactivation stream of conduit 29 is illustrated as being initially cooled by an available stream of coolant, such as water. Heat exchanger 30 is shown as bringing the coolant of conduits 31 and 32 into intimate association with the reactivation gas stream of conduit 29. Vaporized hydrocarbons and water are thereby condensed into liquid and the mixture of condensed liquids and uncondensed gas is passed into conduit 33.

The liquids and gas of conduit 33 are cooled further under the teachings of the present invention. Valve 34 alternately routes the liquids and gas of conduit 33 through a unit cooled with mechanical refrigeration, or bypasses the unit. The details of this unit cooled with mechanical refrigeration will be disclosed in greater detail subsequently. For the moment, an appreciation of the general function of the regeneration system, is desired.

Three-phase separation of the mixture of liquids and gas through valve 34 takes place in separator 35, illustrated in one of many well-known forms. The liquefied hydrocarbons are removed through conduit 36, conducted to a stabilizer, and/or storage, not shown. Water is removed through conduit 37 for disposal. The remaining, cooled, reactivation gas is then delivered to conduit 38 for re-entry into the main stream in conduit 5.

Cooling of towers 8 and 9

Using the specific arrangement shown in FIG. 1, it is reviewed that tower 9 is shown with a hot stream of reactivation gas passing through it in order to vaporize the hydrocarbons and the water left in the bed by the main stream. After this vaporization step, the bed within tower 9 should be cooled before the main stream is again passed through it. Cooling of the bed in tower 9 will raise its adsorptive capacity. Further, cooling the bed of tower 9 will prevent its heat being passed into conduit 16 when the main stream is passed through it.

If the bed in tower 9 is so hot that the temperature of the main stream is raised as it is passed through the bed, the main stream could heat the conduit 16 and transmission lines downstream enough to rupture connections and equipment downstream of the process, requiring costly repairs and replacements. Therefore, a portion of the reactivation period for tower 9 is preferably used to pass a cooling stream of fluid through the bed of tower 9. The reactivation circuit out of the separator could be so cool that this stream in conduit 39 will reduce the temperature within the tower 9 satisfactorily. It might also be feasible to route at least a portion of the main stream leaving tower 8 through tower 9 for this purpose if the heat balance of the system kept the temperature rise of the processed gas in conduit 16 low enough to protect the components downstream.

To carry out the technique of utilizing the regeneration stream itself to cool tower 9, valve 40 is disclosed here to alternately pass the cool stream of conduit 39 through a heating source or directly into conduit 20. A time-cycle controller at station 41 is utilized to allocate the portion of each cycle used for this purpose. Station 41 also contains a time-cycle mechanism whereby the two sets of tower valves may be switched to alternate the towers between the main and the reactivation streams.

As the heat from the towers 8 and 9 is so important, a temperature responsive element 41A is placed in conduit 29, below the junction of branch conduit 25 and 26. Element 41A actuates a relay in the circuit between the time-cycle controller 41 and the tower valves. Should the temperature out of the tower on regeneration not be lowered sufficiently to safeguard downstream equipment, element 41A will hold the valves in the position they had when the excessive temperature was reached.

Valve 40 routes the cool stream of conduit 38 through either conduit 42 or 43. Conduit 42 takes the cool stream through heater 44 to pick up the heat required for re-activation of the absorbent material. Conduit 45 receives the heated reactivation stream and passes it directly to conduit 20. Thus, valve 40 routes the cool stream of the second circuit from conduit 38 to conduit 20, alternately heated for predetermined times prior to passage through the towers.

Power for the regeneration circuit

Differential valve 54 is mounted in conduit 5 and positioned to regulate the split-off portion of the main stream gas passed into the regeneration circuit. Depending on the position of valve 54, more or less differential pressure is developed between the two points in conduit 5 at which conduits 38 and 39 of the regeneration circuit connect the regeneration circuit to conduit 5.

Valve 54 is normally modulated by the force developed from the differential pressure appearing across orifice 56 in conduit 20. As the differential pressure across orifice 56 varies, the mechanism within controller 55 adjusts valve 54 to change the differential pressure between conduits 38 and 39.

Orifice 56 is exposed to the variation in temperature of the regeneration gas as this gas is alternately received from conduit 45 and conduit 43. This flowing temperature of the regeneration stream thus varies the flow rate through the second circuit. Regulation of valve 54 from the differential across orifice 56 is in the direction necessary to maintain the desired flow rate through orifice 56. The result is automatic regulation in the correct direction to maintain the flow rate of regeneration gas required to efficiently strip the adsorbent material in the tower of water and hydrocarbons and cool the bed of material prior to its again processing the main flow stream.

Analysis of regeneration circuit conditions

The wide variations in flowing conditions of well streams is appreciated. However, it is reasonable to consider that the present apparatus will process a stream having a temperature range from 80° F. to 90° F. and a pressure range of 800 to 1200 pounds per square inch. This main stream may be reasonably lean in liquefiable hydrocarbons, i.e. $C_{5+}$, which may be recovered by this adsorption process. Considering a wide variation in the amount of this hydrocarbon material available on a basis of gallons per million cubic feet of gas processed, the economics of applying the present invention have to be calculated for each stream. However, the concept of the present invention extends the practicality of the open-cycle type of regeneration circuit in many applications not heretofore exploited.

Specifically, considering the main stream as it is processed, its temperature is raised for a short time by contact with a relatively hot bed of adsorbent. Also the regeneration system may be designed to heat exchange the main stream with the heated regeneration stream. The amount of heating the main stream can take is limited by at least the mechanical considerations indicated in the discussion of tower cooling.

More specific temperatures can be considered in analysis of the regeneration circuit. Reference to FIG. 2 will illustrate the relation of these temperatures to a cycle of operation of thirty minutes duration. The 80 F. split-off portion of the main stream is brought to 600 F. by heater 44 for thirteen minutes. Heater 44 is then by-passed for seventeen minutes. Curve A shows this temperature variation of the regeneration stream in conduit 20.

The temperature of 41A is the result of the two-level temperature shift of the regeneration stream entering the beds, as depicted by curve B. The temperature swings from about 130 F., at the beginning of each cycle, dipping down to about 120 F. before starting to climb as the 600 F. heating moves a heat plug down through the bed in the tower. The peak temperature reached is in the neighborhood of 400 F., after which the cooling effect drops the 41A temperature sharply downward to start the next cycle at about 130 F.

The rising temperature of the regeneration stream, shown by curve B, vaporizes water and hydrocarbons from the bed. The vaporization of the water and hydrocarbons causes the curve B to slightly decrease its rate of rising at about 200 F. and about 300 F. The present invention is directly concerned with bringing a large cooling effect to bear on the regeneration circuit after it has passed through the bed with this rise in its temperature. The highest concentration of $C_5$ to $C_7$ can be recovered from the regeneration gas if the stream is cooled for a selected portion of its cycle as it comes from the bed with the high concentration of $C_5$ to $C_7$.

Normally, economic cooling available for regeneration cycles can be had from blowing air over a finned heat exchanger, heat exchanging water with the regeneration gas or heat exchanging the main stream with the regeneration gas. Any of these cooling media, at ambient conditions, reduce the temperature of the regeneration stream toward the desired equilibrium conditions of the main stream. However, the lower limit of the regeneration temperature depression by these means is in the neighborhood of 100 F. The temperature must be brought to, or below, the 80 F.–90 F. of the main stream to obtain the desired conditions of equilibrium at which there will be no loss of the liquefiable hydrocarbons or at which no undesirable dead-load will be added to the beds to shift between the beds. Mechanical refrigeration can be used to meet this problem.

Mechanical refrigeration is, admittedly, expensive. It has a high initial cost and a high continuing cost of operation. However, from a study of curve B the applicants have discovered that the mechanical refrigeration need not be applied to the regeneration circuit continuously to be effective in reducing the liquefiable hydrocarbon content to gain a satisfactory equilibrium with the main stream. Most of the $C_5$ to $C_7$ concentration in the regeneration stream is developed as the regenerated bed is heated from 150 F. to 300 F. This temperature rise occurs over only about one to two minutes of a thirty-minute cycle. Therefore, a time span of mechanical refrigeration application need take place over a small range of two or three minutes to drop the temperature of the regeneration stream down low enough to condense sufficient $C_5$ to $C_7$ to achieve the desired object of the invention. Graphically, curve C illustrates the pattern of temperature development. Conventional cooling is shown as dropping the temperature of the regeneration circuit down to the neighborhood of 100 F. Mechanical refrigeration is illustrated as applied for the few minutes necessary to drop the temperature to, at, or below, the temperature of the main stream.

In obtaining the desired cooling effect, it has been discovered that a unit for mechanically refrigerating the regeneration stream need not be sized to supply the total amount of cooling necessary over the short span of time it is needed. In general, a relatively small refrigerating unit can be continuously run to store its refrigeration effect in a cooling capacity. The cooling capacity, and the continuously operated refrigerating unit, can then be applied over the short time the temperature of the regeneration circuit increases over the temperature range required to achieve the condensation which will bring the regeneration stream to the desired equilibrium. In FIG. 1 the apparatus required to accomplish this process is illustrated.

*Cooling of the regeneration circuit with mechanical refrigeration*

When FIG. 1 was initially referred to, the liquids and gas of conduit 33 were described as a product of heat exchanger 30. Valve 34 alternately routed the liquids and gas of conduit 33 through a unit cooled with mechanical refrigeration and a bypass around the unit.

The unit cooled with mehcanical refrigeration, previously indicated, is depicted as a container 60 in which there is a water bath 61. The water bath 61 acts as a heat transfer medium between a group of tubes 62 and a group of tubes 63. Valve 34 connects tube group 62 with conduit 33 so that the gas and liquids of conduit 33 will enter tube group 32 and have their temperature reduced by the relatively colder water bath 61. Tube group 62 then discharges its gas and liquid to conduit 64 in order to take the cooled liquids and gas into separator 35.

Valve 34 alternately connects conduit 33 with bypass conduit 65. By this means, the liquids and gas of conduit 33 are routed around container 60 and introduced directly into conduit 64. In this way, the gas and liquid of conduit 33 are introduced into separator 35 after having been brought to a temperature in the neighborhood of 100 F. by the conventional cooling represented by heat exchanger 30 or the liquids and gas of conduit 33 are introduced into separator 35 after having been reduced in temperature by the cooling effect produced by the water bath 61 in container 60. With water bath 61 correctly sized and maintained at a temperature in the neighborhood of 50° F., the gas will be cooled by heat exchange with this water to substantially the temperature of the main stream with which it will be finally combined.

Tube group 63 is depicted as included in a circuit which also includes a mechanical refrigeration unit 66. The specific type of mechanical refrigeration unit depicted at 66 depends on many factors. A sulphur dioxide or ammonia compression, or ammonia absorption or adsorption units, are normally contemplated, sized to continually supply a cooling effect to tube group 63 which will maintain the temperature of water bath 61 low enough to cool the liquids and gases of conduit 33 to the equilibrium conditions equal to those of the main stream.

Referring, again, to FIG. 2, three-way valve 34 is actuated to bring mechanical refrigeration into the process shortly after heater 44 has been bypassed. If the process repeats its temperature pattern consistently, it is conceivable that station 41 could satisfactorily actuate valve 34 through a time-cycle unit. However, the temperature sensed by element 41A would appear to be a variable index closely coupled to the demand for this increase in cooling of the regeneration circuit. A simple controller in station 41 will respond to element 41A and actuate valve 34 at the desired temperature values indicated on curve B.

In actual practice, it may be found desirable to utilize the level of hydrocarbons collected in trough 67 within separator 35 as a control index. Float 68 represents means responsive to the level of hydrocarbons in trough 67. Float 68 is arranged to actuate a mechanism which establishes a control impulse into station 41. The precise manner in which the level of hydrocarbons in trough 67 could be utilized to actuate valve 34 falls in the area of empirical investigation. It is conceivable that the temperature values sensed by element 41A could switch valve 34 to introduce the liquids and gases of conduit 33 into container 60 and float 68 take over the control system to switch valve 34 back to apply conventional cooling to the regeneration circuit when the level of hydrocarbons starts to decrease. Thus, the concept of the control of valve 34 has been visualized with complete flexibility between time-cycling, a temperature of the regeneration circuit and the quality of recovered hydrocarbons functioning as indices of control.

When valve 34 directs the output of conduit 33 into conduit 65, the material remaining in tube group 62 may conceivably have hydrates formed in it by the cooling effect of water bath 61 to which it is continuously subjected. To inhibit the formation of hydrates in tube group 62, which would mechanically plug the passages within the tubes of the group, a source of hydrate inhibitor indicated at 69 is indicated as actuated to introduce the inhibitor at the appropriate times.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In the removal of water vapor and condensable hydrocarbons from natural gases involving the contact of adsorbent material with a main flow stream of gas with resultant adsorption of the water and condensable hydrocarbons by the adsorbent material and subsequent treatment of the adsorbent material with a heated reactivation agent to vaporize and remove the water and condensable hydrocarbons and thereby reactivate the adsorbent material for further contact with the main flow stream of natural gases,
splitting off a portion of the main flow stream of gas for use as the reactivation agent,
heating the split-off portion of the main flow stream which is to be used as the reactivation agent,
passing the heated reactivation stream through adsorbent material after the material has adsorbed water and hydrocarbons from the main flow stream of gas,
heat exchanging the reactivation gas which has adsorbed water and hydrocarbons from the main flow stream with a body of material cooled with mechanical refrigeration for only a limited period of time which includes the time the reactivation gas contains the highest concentration of selected liquefiable components which had been removed from the adsorbent material,
and recovering the components cooled by the heat exchange with the body cooled with mechanical refrigeration as the components condense from the reactivation gas.

2. Apparatus for removing water vapor and recovering condensable hydrocarbons from natural gas including,
a bed of adsorbent material which will remove water and hydrocarbons from natural gas upon contact,
a first circuit conducting natural gases through the bed of adsorbent material,
a second circuit connected to the first circuit across a differential pressure drop in the first circuit for splitting-off a portion of the natural gases of the first circuit in a reactivation stream for the bed of adsorbent material,
a heater for the reactivation stream in the second circuit as the gas stream passes into the bed so the gas stream will reactivate the adsorbent material of the bed by vaporizing the water and hydrocarbons it adsorbed,
a heat exchange body,
means for periodically coupling the heat exchange body to the second circuit so that the reactivation gas will be cooled by the heat exchange body,
means for cooling the body of heat exchange material with mechanical refrigeration,
means for selectively heat exchanging the body of material with the reactivation gas of the second circuit for only a limited period of time which includes the time the reactivation gas contains the highest concentration of selected liquefiable components which had been removed from the adsorbent material,
and a separator for recovering the components condensed from the second circuit.

3. In a process for removing water vapor and condensable hydrocarbons from natural gases involving the contact of adsorbent material with a main flow stream of the natural gases with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases,
establishing a differential pressure in the main flow stream of natural gases,
driving a portion of the main flow stream of natural gases as the reactivation agent with the differential pressure,
periodically heating the reactivation agent,
passing the periodically heated reactivation agent through the adsorbent material which has water and hydrocarbons adsorbed from the main flow stream of natural gases,
applying a mechanical refrigerating effect in heat exchange with the reactivating agent as the agent flows from the adsorbent material only during a limited portion of the time when the temperature of the agent is increasing as the agent flows from the bed and before the refrigerating effect is applied,
recovering the condensate resulting from applying the refrigeration effect to the agent,
and returning the reactivation agent to the main flow stream.

4. An apparatus for removing water vapor and recovering condensable hydrocarbons from natural gas including,
a bed of adsorbent material with which to contact the natural gas and remove water and hydrocarbons from the natural gas by adsorption,
a first circuit conducting the natural gas through the bed of adsorbent material,
a restriction in the flow of natural gas of the first circuit to establish a pressure differential between two points on opposite sides of the restriction in the first circuit,
a second circuit connected to the first circuit at the two points across the restriction in the first circuit to drive a portion of the natural gas of the first circuit through the second circuit as a reactivation agent for the bed of adsorbent material,
a source of heat which is periodically applied to the second circuit as the reactivation gases of the second circuit are passed into the bed of adsorbent material, a heat exchange body, means for periodically coupling the heat exchange body to the second circuit so that the reactivation agent will be cooled by the heat exchange body, means for continuously cooling the heat exchange body with mechanical refrigeration, means for heat exchanging the body with the reactivation agent for only a limited portion of the time when the temperature of the reactivation agent from the adsorbent bed is increasing as the agent flows from the bed and before it is coupled to the body, and a separator receiving the cooled reactivation gas and condensate for recovering the condensate.

5. In a process for removing water vapor and condensable hydrocarbons from natural gases involving the contact of adsorbent material with a main flow stream of the natural gases with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases, establishing a differential pressure in the main flow stream of natural gases, driving a portion of the main flow stream of natural gases as the reactivation agent with the differential pressure, periodically heating the reactivation agent, passing the periodically heated reactivation agent through the adsorbent material which has water and hydrocarbons adsorbed from the main flow stream of natural gases, cooling the reactivating agent coming out of the adsorbent material continuously with cooling medium available at ambient conditions, cooling the reactivating agent coming out of the adsorbent material periodically with a mechanical refrigerating effect only during a limited portion of the period of the reactivation agent is increasing in temperature as the agent comes out of the adsorbent to bring the equilibrium between the liquid and gas phases of the reactivating agent toward substantial equality with liquids and gas phases of the main flow stream, replenishing the mechanical refrigeration effect continuously, recovering the condensate produced by applying the refrigeration effect to the agent, and returning the reactivation agent to the main flow stream.

6. An apparatus for removing water vapor and recovering condensable hydrocarbons from natural gas including, a bed of adsorbent material with which do contact the natural gas and remove water and hydrocarbons from the natural gas by adsorption, a first circuit conducting the natural gas through the bed of adsorbent material, a restriction in the flow of natural gas of the first circuit to establish a pressure differential between two points on opposite sides of the restriction, a second circuit connected to the first circuit at the two points across the restriction in the first circuit to drive a portion of the natural gas of the first circuit through the second circuit as a reactivation agent for the bed of adsorbent material, a source of heat which is periodically applied to the second circuit as the reactivation gases of the second circuit are passed into the bed of adsorbent material, a source of coolant available at ambient conditions continuously applied to reduce the temperature of the reactivation agent from the adsorbent bed, a heat of exchange body, means for periodically coupling the heat exchange body to the second circuit so that the reactivation agent will be cooled by the heat exchange body, means for continuously cooling the heat exchange body mechanically, means for heat exchanging the body with the reactivation agent for only a limited portion of the time when the temperature of the reactivation agent from the adsorbent bed is increasing, and a separator receiving the cooled reactivation gas and condensate for recovering the condensate.

7. In a process for removing water vapor and condensable hydrocarbons from natural gases involving the contact of adsorbent material with a main flow stream of the natural gases with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases, establishing a differential pressure in the main flow stream of natural gases, driving a portion of the main flow stream of natural gases as the reactivation agent with the differential pressure, heating the reactivation agent, passing the heated reactivation agent through the adsorbent material which has water and hydrocarbons adsorbed from the main flow stream of natural gases, continuously cooling the reactivating agent coming out of the adsorbent material with a cooling medium available at ambient conditions, continuously cooling a storage capacity for cooling effect with a relatively small mechanical refrigeration unit, periodically cooling the reactivating agent coming out of the adsorbent material with the stored cooling effect and the relatively small mechanical refrigeration unit for only a limited period of time which includes the time the reactivation agent contains the highest concentration of selected liquefiable hydrocarbons to bring the reactivating agent and the main flow stream toward the same equilibrium conditions, recovering the condensate produced by applying the refrigeration to the agent, and returning the reactivation agent to the main flow stream.

8. An apparatus for removing water vapor and recovering condensable hydrocarbons from natural gas including, a bed of adsorbent material with which to contact the natural gas and remove water and hydrocarbons from the natural gas by adsorption, a first circuit conducting the natural gas through the bed of adsorbent material, a restriction in the flow of natural gas of the first circuit to establish a pressure differential between two points on opposite sides of the restriction, a second circuit connected to the first circuit at the two points across the restriction in the first circuit to drive a portion of the natural gas of the first circuit through the second circuit as a reactivation agent for the bed of adsorbent material, a source of heat which is applied to the second circuit as the reactivation gases of the second circuit are passed into the bed of adsorbent material, a source of coolant available at ambient conditions continuously applied to reduce the temperature of the reactivation agent from the adsorbent bed, a tank of liquid, means for periodically heat exchanging the tank of liquid with the reactivating agent coming out of the adsorbent material for only a limited period of the time which includes the time the reactivation agent contains the highest concentration of selected liquefiable hydrocarbons, whereby the reactivating agent and the main flow stream are brought toward the same equilibrium conditions, and a separator receiving the cooled reactivation gas and condensate for recovering the condensate.

9. An apparatus for removing water vapor and recovering condensable hydrocarbons from natural gas including, a bed of adsorbent material with which to contact the natural gas and remove water and hydrocarbons from the natural gas by adsorption, a first circuit conducting the natural gas through the bed of adsorbent material, a restriction in the flow of natural gas of the first circuit to establish a pressure differential between two points on opposite sides of the restriction, a second circuit connected to the first circuit at the two points across the restriction in the first circuit to drive a portion of the natural gas of the first circuit through the second circuit as a reactivation agent for the bed of adsorbent material, a source of heat which is applied to the second circuit as the reactivation gases of the second circuit are passed into the bed of adsorbent material, a first heat exchanger in the second circuit with which a source of coolant available at ambient conditions is continuously applied to reducing the temperature of the reactivation agent coming from the adsorbent bed, a second heat exchanger of relatively large storage capacity, a relatively small mechanical refrigeration unit, means for connecting the refrigeration unit to the second heat exchanger so that the unit will continuously extract heat from the large storage capacity of the second heat exchange, means for periodically connecting the second heat exchanger to the second circuit for only a limited period of time which includes the time the reactivation agent contains the highest concentration of selected liquefiable hydrocarbons to bring the reactivation agent and the main flow stream of the first circuit toward the same equilibrium conditions, and a separator receiving the cooled reactivation gas and condensate to recover the condensate as condensable hydrocarbons.

10. The apparatus of claim 9 including, means for injecting hydrate inhibitor in the second circuit ahead of the connection to the second heat exchanger, whereby hydrates are prevented from forming in the reactivation agent remaining in the second heat exchanger during the period the second heat exchanger is being cooled by the refrigeration unit and is disconnected from the second circuit.

11. The apparatus of claim 9 in which, control means is provided to coordinate the connecting of the second heat exchanger to the second circuit with the application of the source of heat to the second circuit so that the second heat exchanger is connected to the second circuit for only a limited period of the time when the temperature of the reactivation agent out of the adsorbent bed is increasing and contains the highest concentration of $C_5$ to $C_7$, whereby the regeneration agent and the main stream are brought toward equilibrium with respect to $C_5$ to $C_7$ components.

12. A system for recovering natural gasoline liquids from natural gas including, beds of dry desiccant which alternately contact the natural gas and remove the natural gasoline liquids from the main natural gas stream, a regeneration stream of gas removed from the main stream, means for heating the regeneration stream and passing it through each bed of desiccant to vaporize the natural gasoline components in the beds, cooling means permanently coupled to the regeneration stream and utilizing a cooling medium available at ambient temperature, a cold reservoir continuously coupled to a continuously run mechanical refrigeration unit, control means for coupling the cold reservoir and mechanical refrigeration unit to the regeneration stream only for a period of time after the regeneration stream has been heated and passed through a bed and contains a high concentration of the natural gasoline liquids, and a separator receiving the cooled reactivation stream and condensed gasoline liquids for recovery of the gasoline liquids.

References Cited in the file of this patent

UNITED STATES PATENTS

| | | |
|---|---|---|
| 2,629,460 | Maki | Feb. 24, 1953 |
| 2,690,814 | Reid | Oct. 5, 1954 |
| 2,880,818 | Dow | Apr. 7, 1959 |

FOREIGN PATENTS

| | | |
|---|---|---|
| 283,508 | Great Britain | June 11, 1929 |

UNITED STATES PATENT OFFICE
CERTIFICATION OF CORRECTION

Patent No. 3,012,630                          December 12, 1961

Leslie L. Lamb et al.

It is hereby certified that error appears in the above numbered patent requiring correction and that the said Letters Patent should read as corrected below.

Column 2, line 56, for "advance" read -- advantage --; column 5, line 3, for "repreesnted" read -- represented --; column 11, line 56, for "do" read -- to --; column 13, between lines 3 and 4, insert the following: -- a relatively small mechanical refrigeration unit, means for continuously operating and applying the refrigeration unit to reducing the temperature of the tank of liquid, --.

Signed and sealed this 24th day of April 1962.

(SEAL)
Attest:

ESTON G. JOHNSON                                    DAVID L. L. LADD
Attesting Officer                                        Commissioner of Patents